United States Patent [19]

Aya et al.

[11] 3,936,090
[45] Feb. 3, 1976

[54] VEHICLE DOOR

[75] Inventors: Norimoto Aya, Yokosuka;
Kunihoiro Takahashi, Fujisawa;
Kenji Osaka, Chigasaki; Naohito Kusunose, Fujisawa, all of Japan

[73] Assignee: Nissan Motor Co., Ltd., Yokohama, Japan

[22] Filed: Feb. 27, 1974

[21] Appl. No.: 446,267

[30] Foreign Application Priority Data
Feb. 28, 1973 Japan................................ 48-23289
Mar. 12, 1973 Japan........................... 48-29749[U]

[52] U.S. Cl.................... 296/146; 49/502; 188/1 C; 280/150 B
[51] Int. Cl.² ............................................. B60J 5/00
[58] Field of Search.................. 296/146, 153, 28 R; 280/150 B; 49/440, 441, 502; 188/1 C

[56] References Cited
UNITED STATES PATENTS
2,058,181 6/1935 Schankin............................. 296/28 R
3,400,979 9/1968 James................................... 296/153
3,810,656 5/1974 Fox et al.............................. 188/1 C FOREIGN PATENTS OR APPLICATIONS
1,962,279 6/1971 Germany............................ 296/146

Primary Examiner—Robert J. Spar
Assistant Examiner—Gary Auton

[57] ABSTRACT

Inner and outer reinforcing and shock absorbing members are mounted on the inner panel of a vehicle door. The inner member is designed to provide only low resistance to a lateral impact force caused by a lateral collision and the outer member is designed to provide high compression resistance in a fore-and-aft collision of a vehicle.

1 Claim, 15 Drawing Figures

VEHICLE DOOR

The present invention relates in general to a body construction of vehicles such as automobiles. More particularly, this invention is concerned with a door reinforcing and shock absorbing construction which is specifically designed for absorbing impact forces of a collision, and for effectively preventing deformation of the passenger cabin of an automobile.

When an automobile collides with another one running in an opposite direction or with one parked on the road, shock or impact forces occur which are applied to various sections of the body. For coping with such a collision, there have been proposed and developed many shock absorbing constructions and devices which are intended somehow to absorb and/or pass away such shock or impact forces protecting the passengers of an automobile in such collision. Such constructions and devices are generally classified into one group of devices which are designed to cushion out the above-mentioned shocks of collision by way of self-deformation or shock absorbing motion, for instance, such as a bumper, etc., and another group of constructions which are designed to absorb or pass away such impact energy by way of specific elastic or rigid constructions. In actual designs of an automobile, such constructions and devices are naturally compatible and incorporated in combination for assured effects and function against a collision.

In general, the design strength of an automobile's body may be shared to a small extent by the ceiling and the center pillar of the body, however, the body is constructed in such fashion that the major part of such strength is carried by the chassis. In this respect, when there is provided some stiffeners or reinforcement for providing additional strength in the longitudinal and lateral directions of the body above the seat level it is practically possible to substantially improve the safety factor of the body since the impact energies produced at an instance of a collision, head-on or rear end and/or lateral, of the automobile may be effectively absorbed or passed away.

In a design study of absorbing or passing away the impact energies produced at an instance of a collision by way of deformation and/or buckling of the constructional members, one of the most significant viewpoints should be directed to prevent injury or even death due to such deformation or buckling of an automobile body. In order to prevent such accidental injury or death of the passengers of an automobile, it is necessary to prevent a substantial deformation of the passenger cabin. As means for preventing such deformation, it is most effective to reinforce the door construction.

However, the reinforcing or shock absorbing constructions of automobile doors proposed thus far tend to be too heavy or too thick which in turn leads to a substantial increase of constructional or economical burden in the entire construction of the body, thus resulting in a high cost. Alternatively, there would be such a disadvantage that the lateral space of the passenger cabin is reduced due to an increase in the thickness of such door construction, as the outside width of the body is limited by traffic laws or regulations of each country.

In consideration of the above described drawbacks as well as inconveniences in the existing reinforcing construction and/or devices of automobile doors, it would be greatly advantageous to provide such an improved and useful reinforcing and shock absorbing construction for the automobile door which comprises an outer member and an inner member, wherein the former provides a large compression strength against impact forces applied in the longitudinal direction of the automobile body (hereinafter simply referred to as "the longitudinal direction") without affecting the lateral interior space of the passenger cabin, while the latter provides a relatively small compression strength against impact forces applied in the lateral direction of the body (hereinafter referred to as "the lateral direction") without sacrificing the function of the conventional safety pad, whereby a deformation and/or a damage of the passenger cabin is effectively prevented in an emergency of a head-on or rear end collision, while the passenger is assuredly protected from lateral shocks in a lateral collision.

It is therefore a primary object of the present invention to provide an improved reinforcing construction of an automobile door which has a constructional strength enough to absorb and/or pass away a deformation stress produced by impact forces applied in the longitudinal direction in a head-on or rear end collision.

It is another object of this invention to provide an improved reinforcing and shock absorbing construction of an automobile door which is capable of effectively absorbing lateral shocks produced in a lateral collision.

It is still another object of this invention to provide an improved reinforcing and shock absorbing construction of an automobile door of a thickness which does not sacrifice the interior width of the passenger cabin and does not spoil the appearance nor the practical utility of the interior gears of the passenger cabin.

According to this invention, there is provided an improved reinforcing and shock absorbing construction of an automobile door, which comprises an outer reinforcing member of box construction disposed in the vicinity of the upper end of and on the outer surface of an inner panel of the automobile door and having a large compression strength against impact forces applied in the longitudinal direction, an inner reinforcing and shock absorbing member of generally U-shape in cross section disposed in the vicinity of the upper end of and on the inner surface of an inner panel of the automobile door and having a relatively large compression strength against impact forces applied in the longitudinal direction and a relatively small compression strength against impact forces applied in the lateral direction, the inner reinforcing and shock-absorbing member having at least one shouldered portion in each leg thereof, and an elastomeric member disposed on the outer surface of the above-mentioned inner reinforcing and shock absorbing member and adapted for cushioning the lateral impact forces applied in the lateral direction.

The above and other objects, and features of the present invention, will become more apparent from the following detailed description with respect to preferred embodiments of the invention when read in conjunction with the accompanying drawings, in which like parts are designated by like reference numerals.

Figure 6A:
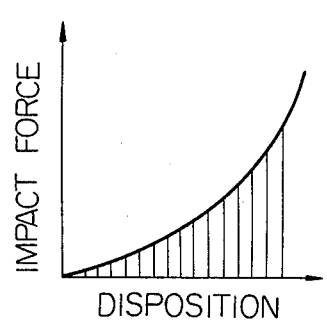
Figure 6B:
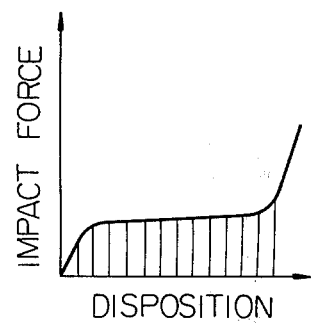

FIGS. 6a and 6b are graphic representations of relationships between impact forces applied to a lateral shock absorbing member or an automobile door construction and the disposition of such impact forces, wherein FIG. 6a illustrates the relationship in the case of prior art, while FIG. 6b illustrates the relationship in the case of the door construction according to this invention; and FIGS. 7a through 7d are perspective views of a variety of embodiments of outer reinforcing members of this invention.

Figures 1, 2, 3:
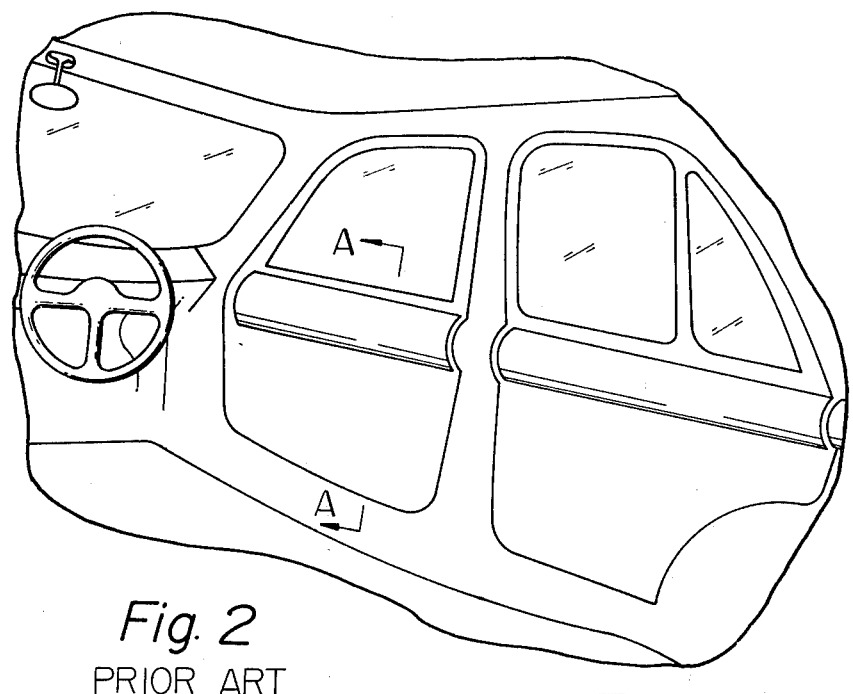
FIG. 1 is a schematic partly cutaway view of an interior of a door arrangement in the passenger cabin of an automobile.
FIG. 2 is a perspective cross section view, taken along the plane designated by the line A—A in FIG. 1, showing a cross-sectional construction of an automobile door according to the prior art.
FIG. 3 is a perspective cross section view, taken along the plane designated by the line A—A in FIG. 1, showing a cross-sectional construction of an automobile door according to the present invention.

Referring now to FIG. 1, there is shown a general door arrangement of an automobile viewed from the inside of the passenger cabin, and FIG. 2 is a perspective part view of a cross section of a door constructed as to the prior art, which is taken along the line A—A in FIG. 1, wherein there are shown a door outer panel 10, a door inner panel 12, an outer reinforcing member 14, and a lateral shock absorbing pad 16. FIG. 3 shows a first preferred embodiment of a reinforcing construction of an automobile door according to this invention, wherein an outer member is designated at 14 for reinforcing and absorbing impact forces applied in the longitudinal direction indicated by the arrow B, an inner member 16 for absorbing impact forces applied in the lateral direction indicated by the arrow C, and a lateral shock absorbing pad is designated by 18.

Figure 4:
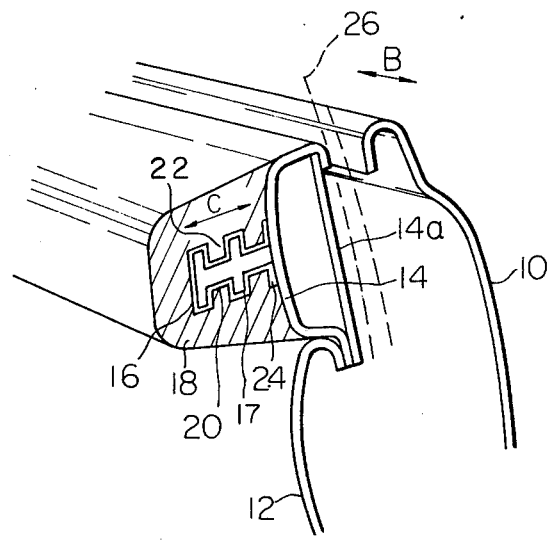
FIG. 4 is an enlarged part cross section view, showing detailed arrangement of door reinforcement constructional members according to this invention installed on both sides of a door inner panel.

Referring now to FIG. 4, there is shown in detail the first embodiment of the door reinforcing and shock absorbing construction of this invention illustrating an outer member 14, an inner member 16, and a lateral shock absorbing pad 18, as well as a window panel 26. The outer member 14 is a reinforcement of box construction constituting an upper edge configuration of the door inner panel 12 and disposed in the vicinity of the upper end of and on the outer surface of the door inner panel 12, which is designed to provide a considerable compression resistance against impact energies in the longitudinal direction in an instance of a head-on or rear end collision of the automobile. The inner member 16 is generally U-shaped in cross section and disposed in the vicinity of the upper end of and on the opposite side or inner surface of the door inner panel 12. The inner member 16 has a pair of leg portions which are firmly mounted on a back portion of the outer member 14 through a pair of flat portions 24. Each of the leg portions is formed with a pair of outwardly extending channel portions 17 which are parallely arranged with respect to the outer member 14. Therefore, the inner 16 has a relatively large compression resistance against impact forces applied in the longitudinal direction while it has a relatively low compression resistance against impact forces applied in the lateral direction.

The above-mentioned lateral shock absorbing pad 18 is of elastomeric material and is installed in a position on the outer surface of the inner reinforcing member 16 for cushioning lateral shocks and preventing them from directly being transmitted to the passengers of the automobile.

In the conventional design and construction of the automobile door, particularly in an event of highspeed and head-on rear end collision, substantial buckling of the door or the doors due to great impact forces produced in the longitudinal direction result in a significant collapse of the passenger cabin causing injuries and even death to the occupants.

The outer reinforcing member 14 of this invention is, as described hereinbefore, of a box construction having a large compression resistance along the longitudinal direction, and by installing this construction in the upper edge of and on the outer surface of the door inner panel, in a head-on or rear end collision of the automobile, it effectively absorbs such great forces produced in the longitudinal direction and thus prevents or diminishes the parallelogrammic deformation or damage of the door or doors, or subsequently the entire passenger cabin. The deformation preventing function of this outer reinforcing member 14 of the door guarantees a survival space for the passenger to a greatly appreciable extent particularly in a serious head-on collision, etc.

Figure 5A:
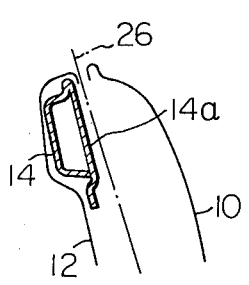
FIGS. 5a through 5e are part cross section views, showing a variety of embodiments of inner reinforcing members of this invention.

The cross-sectional shape of this outer reinforcing member 14 may be varied and modified as shown in the following embodiments of this invention. FIG. 5a shows a second embodiment of the outer member 14 installed on the outer side of the conventional door inner panel 12. In this embodiment, as this member 14 is disposed on the outer side of the inner panel 12, it may be of any profile having as large as possible compression resistance in the longitudinal direction free from any constructional requirement on the part of the door inner panel, and furthermore it may be made free from any requirement for the surface finishing as a part of the inner panel. Incidentally, in this embodiment there may occur some additional reinforcing function by the inner panel to the strength of the outer reinforcing member 14 by virtue of the configuration of the inner panel per se.

Figure 5B:
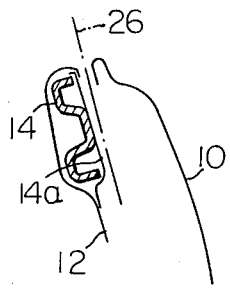

FIG. 5b shows a third embodiment of this invention, wherein the reinforcing member 14 comprises a channel section 14 and a plate 14a, the plate 14a being made of a sheet metal having the same material specifications as the door outer panel 10 and the door inner panel 12. This channel type reinforcing member 14 may be designed with a further larger bending strength than the foregoing embodiments.

Figure 5C:
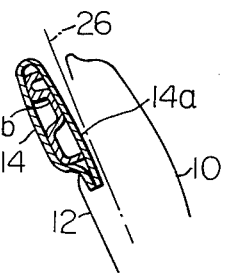

FIG. 5c shows a fourth embodiment of the outer reinforcing member of this invention, which may be considered a combination of the reinforcing member of channel type in the third embodiment and the member 14 of an upper end flanged configuration of the inner panel in the first embodiment of this invention, whereby there is naturally available a largest compression resistances in both longitudinal and lateral directions of the embodiments of this invention.

Figure 5D:
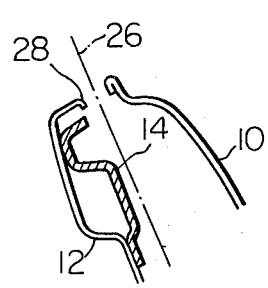
Figure 5E:
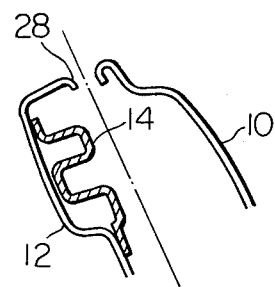

FIGS. 5d and 5e show further embodiments of the outer reinforcing member 14 of this invention, wherein the reinforcing member is welded or otherwise fixed onto the outer surface of the door inner panel 12 except for the upper end flanged area 28 thereof. In this embodiment, as it is not necessary to weld or otherwise fix reinforcing the member 14 in the upper end flanged area 28 of the inner panel 12, it would be easier to maintain the precision in the finish work of the interior members of the passenger cabin.

In such a manner, by introducing such specific construction into the constitutional member of the automobile door, it is now practically possible to provide substantially additional compression resistance in the longitudinal direction to the door without affecting the thickness of the door construction by utilizing an interior space left in the vicinity of the upper end of the door inner panel, or the door well.

Next, in the following is described typical embodiments of the inner member 16 for absorbing lateral shock loads according to this invention, which may be applied in fully interchangeable combination with the above-mentioned outer reinforcing member. Referring back to FIG. 4, this member 16 is a reinforcing member formed in a generally U-shape in cross section from sheet material with the leg portions thereof formed with of least one corrugation or shoulder 22, the end flat portions 24 of which leg portions are available for being installed into position on the upper edge of and on the inner side of the door inner panel, or in the opposite position to the above-mentioned outer reinforcing member 14. Around the outer surface of the member 16 there is positioned in wrapping relation a lateral shock absorbing pad 18, while the interior space thereof is kept vacant. The pad 18 in such an application may be thinner than the conventional shock absorbing pad.

This inner reinforcing member 16 and the lateral shock absorbing pad 18 are, as described above, mutually connected resulting in a compact configuration as a whole. Therefore, if the thus composed inner reinforcing member and lateral shock absorbing pad are installed in the vicinity of the upper edge of the door inner panel in the conventional manner, they do not extrude so long into the lateral interior space of the passenger cabin, as experienced in the conventional shock absorbing pad, thus preventing the interior lateral space of the cabin from being reduced since the cross section of the inner reinforcing member 16 is of a shape providing a high compression resistance in the longitudinal direction thereof and at the same time a relatively low compression resistance in the direction in which both leg portions 20 thereof extend (in the direction of the arrow C in FIG. 4). When the thus obtained inner reinforcing member is installed in position in the vicinity of the upper edge of and on the inner side of the door inner panel, with the lateral shock absorbing pad wrapping therearound, this inner reinforcing member 16 is capable to provide a relatively high compression resistance, in collaboration with the above-mentioned outer reinforcing member 14, to the entire door construction against impact forces applied in the longitudinal direction (in the direction of the arrow B in FIG. 4), thus partly absorbing and/or passing away shock forces produced in the longitudinal direction in an instance of a head-on or rear end collision of the automobile and consequently preventing a parallelogrammic deformation of the door or subsequently the passenger cabin. On the other hand, in case of a lateral collision of the automobile this inner reinforcing member 16 can, by virtue of its relatively low compression resistance in the lateral direction thereof obtained by its specific cross-sectional shape, be collapsed to a substantial extent under impact forces applied in the lateral direction so as to effectively absorb such impact forces, thus safely preventing the lateral shock forces from being transmitted directly to the passengers in the cabin together with the lateral shock absorbing safety pad 18 which elastically contracts to cushion out the shock forces in the lateral direction.

In the various typical embodiments of this invention described hereinbefore in conjunction with the accompanying drawings, although the lateral shock absorbing pad 18 is disposed around the outer surface of the inner reinforcing member 16 in a wrapping relation therewith, the compression resistance of the inner reinforcing member 16 may be designed to be further appropriately smaller so as to provide more buckling capability or contractibility under a given lateral impact force by way of optionally selecting the configuration, thickness, material, etc., thereof, the lateral shock absorbing pad 18 may be omitted.

FIGS. 6a and 6b are graphic representation of relationships between impact loads applied to a lateral shock absorbing member in the door construction and the disposition thereof under such impact forces, wherein FIG. 6a gives the relationship in the case of the prior art, while FIG. 6b illustrates the relationship in the door construction according to this invention. As shown in FIG. 6b, it is clear that the disposition of the shock absorbing member of this invention can occur relatively easily or effectively under a given shock force, which means a relatively effective shock absorbing function of the member.

In FIGS. 7a through 7d, there are shown some typical exemplary embodiments of the inner reinforcing member 16 according to this invention, with a variety of cross sections providing optionally different yet advantageously low compression resistance in the direction shown by the arrow C in FIG. 4, respectively, thus resulting in an effective contractibility or shock absorbing capability against the lateral shock forces produced in an instance of lateral collision of the automobile.

Figure 7A:
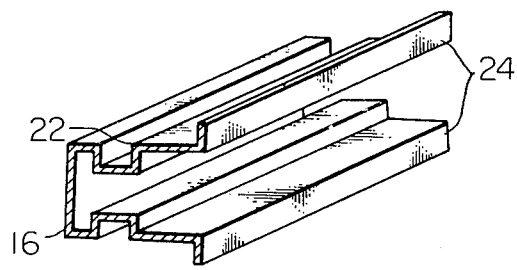
Figure 7B:
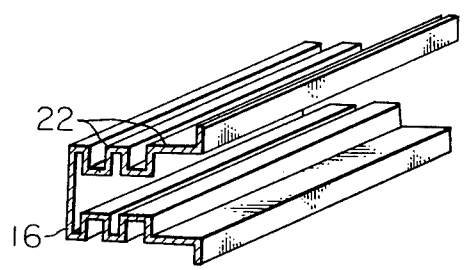
Figure 7C:
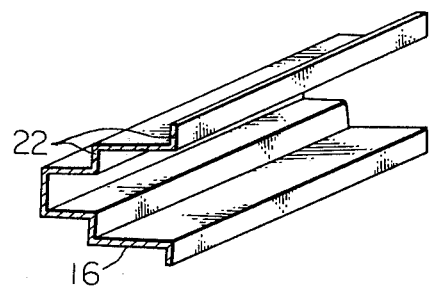
Figure 7D:
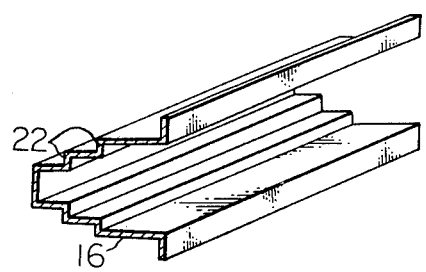

For further details, in FIG. 7a shown is the inner reinforcing and shock absorbing member 16 by way of a second exemplary embodiment wherein there is provided one recess or U-channel in each leg portion thereof to obtain an effectively low compression resistance in the direction shown by the arrow C in FIG. 4. The inner member 16 referred to in FIG. 7b is a third embodiment thereof wherein there are in contrast provided two recesses U-channels, in each leg, thus effectively providing a further lower compression resistance in the direction shown by the arrow C in FIG. 4. FIG. 7c, shows a fourth embodiment of the inner member 16 having in cross section thereof one shoulder in each leg to realize an effectively low compression resistance in the direction of the arrow C in FIG. 4. Referring to FIG. 7d there is shown a fifth embodiment of the inner member 16 having in cross section thereof two shoulders in each leg, consequently effectively providing a still lower compression resistance in the same direction.

As fully described in the above embodiments, this invention is intended for providing reinforcing and shock absorbing members for the door construction of the upper edge portion of and on both sides of the door inner panel, and this reinforcing and shock absorbing members can provide such advantages and effects as stated in the following: in a head-on and/or rear end collision, the outer reinforcing member can, in collaboration with the inner reinforcing and shock absorbing member, effectively absorb the impact forces produced in the longitudinal direction and subsequently pass away or transmit the impact forces between the fore part and the rear part of the automobile, thus substantially increasing the strength of the entire vehicle construction and consequently preventing a serious deformation of the passenger cabin so as to provide a survival space for the passengers, while in a lateral collision the inner reinforcing and shock absorbing member can, together with the lateral shock absorbing member, effectively absorb or diminish the impact forces produced in the lateral direction, and subsequently protect the passengers in the cabin from such lateral shock loads, thus guaranteeing the safety of the automobile occupants, and at the same time providing a good appearance and comfort in the interior of the passenger cabin without sacrifice in the lateral interior space of the cabin.

What is claimed is:

1. Reinforcing and shock absorbing members in combination for a vehicle door having a door inner panel, comprising:

an outer member including an elongated first member having generally a C-shaped cross section, and an elongated second member of a flat sheet, said first and second member being made of metals and being united at the edges thereof to constitute a box construction, said outer member being securely connected to said inner panel in such a manner that said first member forms a desired profile of the upper edge portion of said door inner panel;

an elongated inner member made of a metal and having generally a U-shaped cross section with a pair of leg portions terminating at an open end thereof, said pair of leg portions being firmly mounted, at the open end of said inner member, on the back portion of the first member so that the elongated inner member is arranged in parallel with said outer member and the open end of said inner member is closed by said elongated first member of said outer member, and each of said leg portions having a pair of outwardly extending channel portions which are arranged in parallel with said outer member; and an elastomeric member wrapping said elongated inner member and being firmly mounted on the said elongated first member.

* * * * *